United States Patent [19]

Yanagihara et al.

[11] Patent Number: 4,636,435
[45] Date of Patent: Jan. 13, 1987

[54] POLYMERIC THIN FILM, PROCESS FOR PRODUCING THE SAME AND PRODUCTS CONTAINING SAID THIN FILM

[75] Inventors: Kenji Yanagihara; Mituo Kimura, both of Yokohama; Masahiro Niinomi, Machida, all of Japan

[73] Assignees: Japan Synthetic Rubber Company Limited, Tokyo; Fuji Photo Film Company Limited, Minami-ashigara, both of Japan

[21] Appl. No.: 655,428

[22] Filed: Sep. 28, 1984

[51] Int. Cl.$^4$ .................................................. G11B 5/72
[52] U.S. Cl. ........................................ 428/336; 360/134; 360/135; 360/136; 427/41; 427/128; 427/131; 428/421; 428/422; 428/694; 428/695; 428/463; 428/900
[58] Field of Search ............... 427/41, 40, 128, 131, 427/132; 428/694, 695, 422, 421, 900, 463, 336; 360/134-136

[56] References Cited

U.S. PATENT DOCUMENTS

| | | |
|---|---|---|
| 3,940,506 | 2/1976 | Heinecke ........................... 427/41 |
| 4,188,426 | 2/1980 | Auerbach ........................... 427/41 |
| 4,242,188 | 12/1980 | Ninomi ........................... 427/41 |
| 4,252,848 | 2/1981 | Datta ........................... 428/64 |
| 4,382,101 | 5/1983 | Polak ........................... 427/40 |
| 4,390,601 | 6/1983 | Ono ........................... 428/695 |
| 4,419,404 | 12/1983 | Arai ........................... 428/409 |
| 4,429,024 | 1/1984 | Ueno ........................... 427/296 |
| 4,565,734 | 1/1986 | Arai ........................... 428/336 |
| 4,582,746 | 4/1986 | Shirahata ........................... 428/216 |

FOREIGN PATENT DOCUMENTS

| | | | |
|---|---|---|---|
| 2006702 | 8/1971 | Fed. Rep. of Germany | 427/41 |
| 99932 | 7/1980 | Japan | 427/40 |
| 180503 | 10/1983 | Japan . | |
| 160828 | 9/1984 | Japan | 428/422 |

OTHER PUBLICATIONS

Reprints of Papers Presented by the Division of Organic Coatings and Plastics Chemistry, American Chemical Society, 1982.

*Primary Examiner*—Ellis P. Robinson
*Attorney, Agent, or Firm*—Oblon, Fisher, Spivak, McClelland & Maier

[57] ABSTRACT

The present invention concerns a process for producing a novel polymeric thin film having high density, high hardness and high toughness on the surface of a substrate by plasma polymerization. This process comprises providing a gas containing at least one compound selected from halogenated alkanes, alkanes, hydrogen and halogens in specific combinations for plasma polymerization, the atomic ratio of halogen/hydrogen in the aforesaid gas being 0.1 to 5 and the electron temperature of the plasma in the reaction zone being 6,000° K. or higher and lower than 30,000° K. The polymeric thin film obtained is useful on various articles for the purpose of protection, surface hardening, rust proofing, scratch proofing, providing gas barrier, etc. In particular, it is suitable as the protective film of magnetic recording media.

19 Claims, 3 Drawing Figures

POLYMERIC THIN FILM, PROCESS FOR PRODUCING THE SAME AND PRODUCTS CONTAINING SAID THIN FILM

BACKGROUND OF THE INVENTION

1. Field of the Invention

This invention relates to a novel polymeric thin film, a process for producing said thin film by utilization of plasma polymerization and products containing said thin film.

2. Description of the Prior Art

There have been known processes for preparing a polymeric thin film by providing a saturated or unsaturated hydrocarbon gas for plasma polymerization [H. Yasuda, Contemporary Topics in Polymer Science, Vol. 3, 103 (1979), Ed. by M. Shen, Plenum Publishing Corp.]. The polymeric thin films obtained by these processes, which are higher in crosslinking density and also greater in mechanical strength than the conventional plastics, promise to be utilizable for surface protective films or surface hardening films on various kinds of articles. However, in some uses, these thin films are insufficient in hardness and toughness and therefore cannot be utilized as protective films, etc. For example, it has been attempted to form a plasma polymerized film as the protective film on a magnetic recording medium such as video tape comprising a magnetic metal thin film provided on a non-magnetic support. Such a magnetic recording medium is subjected to frictional contact with a magnetic head, a guide pole, etc. during running and therefore the protective film therefor is required to have a high scratch resistance so that scratches will not be readily formed. Also, particularly in the case of a video tape, mechanical impact is applied repeatedly to the magnetic recording medium during reproduction of still images, so that it is required to have high durability. If the durability is low, the still life time of the magnetic recording medium, which is the time after initiation of reproduction of still image until the whole image disappears due to noise, will become short. However, where the polymeric thin film as mentioned above is formed on a recording medium, the resultant recording medium is low in scratch resistance and short in still life because said polymeric thin film is low in both hardness and toughness.

Most of the plasma polymerized films from hydrocarbons have densities of 1 to 1.5 gm/cm$^3$, but it is known in the art that, depending on the reaction conditions, plasma polymerization of methane can give a thin film of fairly high hardness [A. Doi et al, Proc. Int'l Ion Engineering Congress—ISIAT '83 & IPAT '83, KYOTO (1983), page 1137]. We experimentally confirmed that the plasma polymerized film of methane may have a density higher than 1.5 gm/cm$^3$. However, because of low toughness, the thin film thus prepared is brittle and liable to crack and is therefore unsuitable as a protective film for a product such as a magnetic recording medium which is subjected to harsh conditions. Further, in this case, there is also the drawback that the deposition rate of the thin film is low so that a long time is required for production.

Japanese Laid-open Patent Publication No. 180503/1983 discloses a process for preparing a thin film by carrying out plasma polymerization by use of at least one mixed monomer gas selected from (A)+(B), (A)+(C), (A)+(B)+(C) and (B)+(C), constituted by selection from halogenated hydrocarbon gas (A), hydrocarbon gas (B), hydrogen gas (C) and halogen gas (D), wherein the electron temperature at the site where plasma polymerization is carried out is controlled to 30,000°K. to 90,000°K. and the atomic ratio of halogen atoms to hydrogen atoms in the mixed monomer gas is controlled within a range of from 1:2 to 5:1. Although the thin film obtained according to this process has high hardness, it too is low in toughness and is therefore unsuitable as a protective film for a magnetic recording medium for the same reason as mentioned above regarding the plasma polymerized film obtained from methane.

SUMMARY OF THE INVENTION

Accordingly, one object of the present invention is to provide a polymeric thin film endowed with both high hardness and high toughness.

Another object of the present invention is to provide a process for producing such a polymeric thin film by utilizing plasma polymerization.

Still another object of the present invention is to provide an article of manufacture having the polymeric film mentioned above.

The polymeric thin film provided by the present invention has the advantages of being excellent in abrasion resistance, corrosion resistance and weather resistance as well as being small in frictional coefficient and gas permeability coefficient, in addition to high hardness and high toughness. Accordingly, it is useful as a protective film, surface hardening film, rust proof film, or gas barrier film for various kinds of articles. Further, in the case where the thin film of the present invention is formed on the magnetic metal thin film of a magnetic recording medium, it is possible to obtain a magnetic recording medium having excellent scratch resistance and long still life time. Moreover the preparation process of the present invention has an advantage in that the deposition rate of the polymeric thin film is great, whereby high productivity can be realized.

According to the present invention, there is provided a process for preparing a polymeric thin film on the surface of a substrate placed in a reaction zone by providing a gas containing one or more monomeric compounds selected from halogenated alkanes (A), alkanes (B), hydrogen (C) and halogens (D) in accordance with any of the combinations as set forth below:

(1) only A;
(2) A and B;
(3) A and C;
(4) A and D;
(5) A, B and C;
(6) A, B and D;
(7) A, C and D;
(8) A, B, C and D;
(9) B and D; or
(10) B, C and D, for plasma polymerization, wherein the atomic ratio of halogen/hydrogen in said gas is 0.1 to 5 and the electron temperature of the plasma in the reaction zone for plasma polymerization is 6,000° K or higher and lower than 30,000° K.

BRIEF DESCRIPTION OF THE DRAWINGS

In the accompanying drawings.

DETAILED DESCRIPTION OF THE INVENTION

Figure 1:
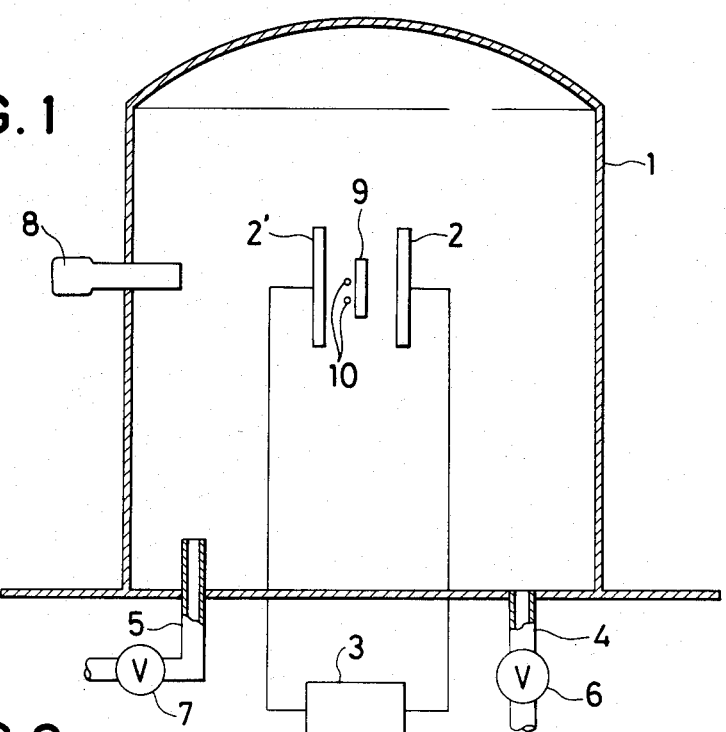
FIG. 1 shows schematically a sectional view of a bell-jar type reactor to be used for practicing the process of the present invention.

Any of the compounds (A) to (D) as described above can be used as the monomer in the process of the present invention, provided that it is gaseous under the reaction conditions as hereinafter described.

The halogenated alkane to be used in the present invention is an alkane, namely a saturated aliphatic hydrocarbon, of which at least one hydrogen is substituted by halogen atoms such as fluorine, chlorine, bromine or iodine, preferably one having 1 to 4 carbon atoms, more preferably 1 or 2, and being substituted by fluorine or chlorine. Such compounds may include, for example, monofluoromethane, difluoromethane, trifluoromethane, tetrafluoromethane, monochloromethane, dichloromethane, trichloromethane, tetrachloromethane, monofluorodichloromethane, monofluoroethane, trifluoroethane, tetrafluoroethane, pentafluoroethane, hexafluoroethane, dichloroethane, tetrachloroethane, hexachloroethane, difluorodichloroethane, trifluorotrichloroethane, monofluoropropane, trifluoropropane, pentafluoropropane, perfluoropropane, dichloropropane, tetrachloropropane, hexachloropropane, perchloropropane, difluorodichloropropane, tetrafluorodichloropropane, monofluoro n-butane, trifluoro n-butane, tetrafluoro n-butane, octafluoro n-butane, difluoro n-butane, monofluoro isobutane, difluoro iso-butane, pentafluoro iso-butane, heptafluoro iso-butane, difluro iso-butane, monochloro n-butane, tetrachloro n-butane, dichloro iso-butane, tetrachloro iso-butane, monofluorodichloro n-butane, difluorodichloro iso-butane, tetrafluorodichloro, isobutane and the like. Particularly preferable compounds are trifluoromethane, tetrafluoromethane, tetrafluoroethane and hexafluoroethane.

The alkane, namely saturated aliphatic hydrocarbon to be used in the present invention may preferably have 1 to 10 carbon atoms, more preferably 1 to 4 carbon atoms, as exemplified by methane, ethane, propane, butane, pentane, hexane, heptane, octane, nonane, decane and isomers thereof. Particularly preferred are methane, ethane, propane, n-butane and iso-butane.

The halogen which may used in the process of the present invention may include fluorine, chlorine, bromine and iodine. Fluorine and chlorine are preferred.

In the process of the present invention, the gas to be provided for plasma polymerization contains one or more compounds selected from the compounds (A) to (D) in accordance with any of the combinations (1) to (10) as set forth above. The atomic ratio of halogen/hydrogen in said gas must be 0.1 to 5, preferably 0.2 to 2. If the ratio is less than 0.1, the thin film obtained is low in toughness, although it has high density and high hardness. On the contrary, if the above ratio is greater than 5, the polymerization rate will be lowered so that a long time is required for obtaining a thin film with a desired thickness. Accordingly, for example, when employing tetrafluoroethane and methane as the monomers, it is suitable to use them at a volume ratio (under standard conditions) of 1:10 to 5:1, while when employing hexafluoroethane and methane as the monomers, it is suitable to use them at a volume ratio (under standard conditions) of 3.3:1 to 1:15. When two or more kinds of monomeric compounds are used in combination, they can be introduced into the reactor as a gas mixture or separately into the reactor to be mixed therein.

In the process of the present invention, it is required that the electron temperature of the plasma in the reaction zone, more specifically, for example, in the region within 1 to 3 cm from the surface of the substrate in the direction perpendicular thereto, during plasma polymerization, should be 6,000° K. or higher and less than 30,000° K., preferably from 10,000° to 28,000° K. If the electron temperature is less than 6,000° K., a thin film having unevenness on the surface will be formed. On the other hand, if the electron temperature is 30,000° K. or higher, the thin film formed will be high in density and hardness but will be low in toughness.

The electron temperature referred to herein is that measured by the method using a probe for measurement of plasma characteristics disclosed in Japanese Laid-open Patent Publication No. 135574/1979 and U.S. Pat. No. 4,242,188, the disclosures of which are incorporated by reference herein. The electron temperature can be controlled to a desired value by varying the discharging power for excitation of plasma, discharging current, pressure of the gas containing monomers, flow rate of said gas, structure of electrodes, position of substrate, etc.

Other conditions in the process of the present invention may be substantially the same as those in conventional plasma polymerization. The degree of vacuum during plasma polymerization may be $1 \times 10^{-3}$ to 1 Torr, and the flow rate of the gas containing monomers flowing into the reactor may be, for example, 0.1 to 100 cc (STP)/min. in the case of a reactor having an inner volume of 100 liter. The above-mentioned gas may be mixed with an inert gas such as argon, helium, xenon, neon and the like before or after being charged into the reactor. The substrate temperature during plasma polymerization is not particularly limited, but is preferably between 0° and 300 ° C.

The type of discharge to be used for generation of plasma is not particularly limited and any of DC discharge, low frequency discharge, high frequency discharge and micro-wave discharge may be used. Also, the reaction device to be used for the plasma polymerization is not particularly limited. Therefore either an internal electrode system or an electrodeless system may be utilized. There is also no limitation with respect to the shape of the electrodes or coil, or to the structure of the cavity or antenna in the case of micro-wave discharge. Any of the known devices for plasma polymerization can be utilized.

According to the process of the present invention as described above, a novel amorphous polymeric film with a thickness of 10 Å to 1 μm can be obtained on the substrate, said film essentially consisting of carbon (C), hydrogen (H), halogen (X) and oxygen (O) at an atomic ratio of these elements represented by the following formula:

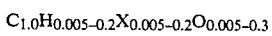

and having a ratio of the number of hydrogen atoms bonded to carbon atoms having a double bond

to the number of hydrogen atoms bonded to carbon atoms having only single bonds

of 0 to 0.1 and a density of 1.6 to 3.5 g/cm$^3$. The oxygen existing in the polymeric thin film obtained can be presumed to be due to the reaction of the residual active radicals in the film with oxygen in the atmosphere, when the thin film prepared is taken out from the reactor and brought into contact with the atmosphere.

The ratio of the number of hydrogen atoms bonded to carbon atoms having a double bond to the number of hydrogen atoms bonded to carbon atoms having only single bonds is defined as the ratio of the area of the absorption peak existing at 3010 to 3040 cm$^{-1}$ (corresponding to

to that at 2840 to 3000 cm$^{-1}$ (corresponding to

when the IR-absorption spectrum of the thin film is measured by the Fourier Transform Infrared Spectrum method.

On the other hand, the atomic ratios of halogen to carbon (X/C) and oxygen to carbon (O/C) can be measured by, for example, Electron Spectroscopy for Chemical Analysis (ESCA) and the atomic ratio of hydrogen to carbon (H/C) by means of, for example, an elemental analyzer.

The above polymeric thin film is unique in that the constituent elements are markedly enriched in carbon content, with the remainder of the elements of hydrogen, halogen and oxygen being small in amount. Moreover, it may be considered that almost all the carbon atoms have only single bonds, so that there is created a three-dimensional structure like diamond. For this reason, this polymeric thin film has very high density and hardness, and yet it is also high in toughness because it is amorphous.

The process of the present invention has the advantage of greater polymerization rate, namely growth rate of the polymeric thin film, and its rate is at least three times greater than that of the plasma polymerization of methane only. Also, the above thin film obtained according to this process has the advantage of having both high hardness (Vickers hardness of 1000 or higher) and high toughness. Accordingly, it is useful as a surface protective film or surface reinforcing film for various articles, and can exhibit high scratch resistance and long still life time when used as the protective film for a magnetic recording medium. Further, this thin film exhibits high chemical stability to acids, alkalis and organic solvents similarly as the films prepared by conventional plasma polymerization.

In a preferred embodiment of the process of the present invention, the concentration ratio of hydrogen halide (HX) to hydrogen (H$_2$) in the reaction zone for plasma polymerization is controlled within 0.1 to 500, preferably 1 to 100. According to this embodiment, the uniformity and reproducibility in quality of the polymeric thin film formed can be improved. The concentration ratio of hydrogen halide to hydrogen is defined as the ratio of the peak area corresponding to m/e of hydrogen halide molecules (e.g. HF: 20, HCl: 36) to the peak area corresponding to m/e of hydrogen molecules (2), when measured by leading the gas in the reaction zone by differential pumping to a quadrupole mass analyzer. The concentration ratio during polymerization can be controlled within a desired range by varying, for example, the flow rate of the gas containing monomers.

In another preferred embodiment of the process of the present invention, the polymeric thin film prepared as described above is further subjected to treatment with hydrogen plasma. By such a post-treatment with hydrogen plasma, the atomic ratios of halogen and oxygen to carbon, respetively, can positively be controlled to within the ranges of from 0.005 to 0.05 and from 0.005 to 0.15, respectively. As a result, a polymeric thin film with a high hardness having a Vickers hardness of 2,000 or higher can surely be obtained, and its transparency can also be enhanced. For example, transmittance of light of 350 to 600 nm through a thin film with a thickness of 1 μm can be enhanced from a value before hydrogen plasma treatment of 95% or higher to a value after the treatment of 99% or higher. A thin film having such a high transparency is useful as the surface reinforcing film for lenses, etc.

The hydrogen plasma treatment as mentioned above may be carried out under the conditions of a gas pressure of $1 \times 10^{-3}$ Torr, an electron temperature of the plasma in the vicinity of the polymeric thin film to be treated (for example, at a distance of 1 to 3 cm from the thin film) of $1 \times 10^{4°}$ to $8 \times 10^{4°}$ K. and a temperature of the polymeric thin film of 0° to 500° C. The flow rate of hydrogen gas to be fed into the reactor may suitably be 0.1 to 100 cc (STP)/min. in the case of a reactor having a volume of 100 liter. The treatment time, which depends on the desired thickness of the polymeric thin film to be formed, may generally be from one second to one hour.

The polymeric thin film formed may be once exposed to the atmosphere before hydrogen plasma treatment, or alternatively it may be subjected to hydrogen plasma treatment subsequent to formation of the thin film without exposure to the atmosphere. In the latter case, the treatment is more effective.

The substrate which may be used in the process of the present invention can be of various materials and can have various shapes depending on the purpose of use.

The materials which may be used for the substrate include, for example, metals such as Fe, Co, Ni, Al, Cu, Sn, Ti, V, Cr, Zn, Mn, Zr, Nb, Mo, Rn, Rh, Pd, Ag, In, Sb, Te, Ta, W, Re, Pt, Au, Pb, Bi, U, etc.; metal oxides such as $Fe_2O_3$, $Fe_3O_4$, $Al_2O_3$, $SnO_2$, $Re_2O_3$, $TiO_2$, $Ti_2O_3$, $LiTi_2O_3$, $WO_3$, $V_2O_3$, $VO_2$, EuO, etc.; metal nitrides such as $Zn_3N_2$, AlN, TaN, TiN, $Fe_2N$, $Cu_3N$, NbN, VN, etc.; metal carbides such as WC, TaC, TiC, $Fe_3C$, $Cu_2C_2$, NbC, $W_2C$, $Mo_2C$, VC, $Mn_3C$, MoC, etc.; alloys such as stainless steel, brass, bronze, duralmin, high speed steel (HIS), high tension steel (HITEN), Kovar, heat-resistant steel, nitride steel, nickel silver, etc.; semiconductors such as crystalline silicon, amorphous silicon, Ge, GaAs, etc.; ceramics such as $SiO_2$, $Si_3N_4$, SiC, diamond, etc.; organic polymeric compounds such as polyethylene, polystyrene, polyethylene terephthalate, polyimide, polymethyl methacrylate, polycarbonate, ABS resin, polypropylene, polyvinyl chloride, polyvinylidene chloride, polytetrafluoroethylene, acetyl cellulose, polyvinylidene fluoride, polytrifluorochloroethylene, polyamide, polyurethane, polyoxymethylene, etc.; inorganic polymeric compounds such as silicones, polystanoxane, polyphosphazen, polyvinyl ferrocene, etc.; glasses and so on. With any of these materials, a thin film having high adhesion to the substrate can be formed.

Further, when it is desired to obtain the polymeric thin film of the present invention in the free form, the above polymeric thin film can be formed according to the process of the present invention on a soluble substrate prepared from, for example, sodium chloride, potassium bromide, etc., followed by dissolving away of the substrate.

The material and the shape of the substrate can be selected depending on the purpose for formation of the thin film, and the process for preparing the thin film of the present invention can be utilized for production of various kinds of articles. With some kinds of articles, still another layer can be formed on the polymeric thin film formed. Accordingly, it is possible to produce various kinds of articles having the polymeric thin film of the present invention as a surface layer or intermediate layer. More specifically, on the surface of metallic articles such as electronic parts, precision machine parts, e.g., rotating shafts, bearings, gears, cylinders, pistons and the like, bolts, nuts, gaskets, sealing members for precision valves, etc., polymeric thin films can be formed for such purposes as providing electrical insulation, rust proofing, scratch proofing, abrasion resistance, etc. It is also possible to utilize the thin film as the protective film for reinforcement of the surface of various plastic products such as plastic lenses, plastic panes, plastic nuts and bolts, plastic sealing members for precision valves and plastic precision machine parts including rotating shafts, bearings, gears, cylinders, pistons, etc.

Also, for the purpose of lowering the gas permeability of various resin films or ensuring gas impermeability of various walls, e.g., the wall of a plastic vacuum vessel, the polymeric thin film of the present invention can be formed on the surface thereof. Moreover, the polymeric thin film of the invention can be formed on the surface of the individual particles of finely powdered material such as powdered diamond which is, for example, to be mixed with other materials to produce a composite product such as a diamond cutting or grinding tool, for the purpose of improving the affinity of the particles for the other materials, whereby the performance of the product obtained can be improved. In addition to the above powdered diamond, such finely powedered materials include, for example, finely powdered metal such as iron, nickel and alminum to be used for the production of rubber switch, electromagnetic shielding boards, etc. Also, the thin film of the present invention can be formed as a protective film on the magnetic metal thin film of a magnetic recording medium such as video tape. If desired, on such a protective film, a lubricant layer may further be formed.

Of the various articles that can be provided with the thin film of the present invention, magnetic recording media are of particular interest. This is because the excellent characteristics of the thin film of the present invention can be particularly advantageously exhibited when applied to such media.

Generally speaking, a magnetic recording medium comprises a non-magnetic support and a magnetic metal thin film provided thereon. When the polymeric thin film of the present invention is formed on the magnetic metal thin film, the scratch resistance and the still life time of the magnetic recording medium can be improved to a great extent. In this case, the thickness of the polymeric thin film should preferably be 20 Å to 0.1 $\mu$m, more preferably 20 Å to 0.04 $\mu$m. When the thickness is less than 20 Å, pinholes may sometimes be formed in the polymeric thin film. On the contrary, a thickness greater than 0.04 $\mu$m will unacceptably lower the recording characteristics of the magnetic recording medium.

The non-magnetic support to be used may have a thickness of 4 to 50 $\mu$m, and may be made of any of various materials including cellulose acetate; nitrocellulose; ethyl cellulose; methyl cellulose; polyamide; polymethyl methacrylate; polytetrafluoroethylene; polytrifluoroethylene; homopolymers or copolymers of $\alpha$-olefins such as ethylene or propylene; homopolymers or copolymers of vinyl chloride; polyvinylidene chloride; polycarbonate; polyimide; polyamide-imide; polyesters such as polyethylene terephthalate; and so on.

The magnetic metal thin film of the magnetic recording medium generally has a thickness of 0.02 to 5 $\mu$m and may be formed by vapor deposition methods or plating methods. The vapor deposition method is inclusive of the vacuum evaporation method, the sputtering method, the ion plating method, the ion beam deposition method and the chemical vapor deposition method. The plating method refers to an electric plating method or an electroless plating method. Materials usable for the magnetic metal thin film include ferromagnetic metals such as Fe, Co, Ni and the like or alloys thereof, and further Fe-Si, Fe-Rh, Fe-V, Fe-Ti, Co-P, Co-B, Co-Si, Co-V, Co-Y, Co-Sm, Co-Mn, Co-Ni-P, Co-Ni-B, Co-Cr, Co-Ni-Cr, Co-Ni-Ag, Co-Ni-Pd, Co-Ni-Zn, Co-Cu, Co-Ni-Cu, Co-W, Co-Ni-W, Co-Mn-P, Co-Sm-Cu, Co-Ni-Zn-P, Co-V-Cr, etc. Preferably, the magnetic thin film contains 50 wt. % or more of Co.

The polymeric thin film of the invention provided on the magnetic metal thin film as described above can be further coated with a lubricant such as a higher fatty acid, a fatty acid ester, a fatty acid amide, a fluorine compound or a silicon compound. Also, the side of the support opposite to that of the magnetic metal thin film can be further provided with a backcoat layer.

The polymeric thin film provided as a surface layer or an intermediate layer on or in the magnetic recording medium can function very effectively as a protective film to provide the recording magnetic recording medium with excellent scratch resistance and still life time.

The present invention is described below in more detail with reference to Examples, which, however, should not be construed as limitative of the present invention. Unless otherwise specifically noted, all the experiments are working examples of the present invention.

EXAMPLE 1

Experiments No. 1 to No. 12 were carried out for forming polymeric films by plasma polymerization on a polycarbonate plate measuring 50×50×5 mm in a bell-jar type reactor as shown in FIG. 1. Experiments No. 7 through 13 are comparative examples. Experiment No. 13 relates to an untreated polycarbonate plate.

In FIG. 1, parallel plate type electrodes, 2, 2' are provided in the reactor 1, and these electrodes are connected to a power source 3 provided outside the reactor 1. To the bottom of the reactor is connected a pipe 5 for charging a gas containing monomers, and the pipe 5 is provided with a valve 7 for controlling the gas flow rate. At another position of the bottom of the reactor, a gas discharging pipe 4 is connected thereto and the pipe 4 is provided with a valve 6 for controlling the pressure in the reactor 1. The side wall of the reactor 1 is equipped with a pressure indicator 8 for monitoring the pressure within the reactor 1.

In practicing the process of the present invention, a polycarbonate plate 9 as the substrate to be treated was placed between the two electrodes 2 and 2', and at a distance of 2 cm from the plate 9 there was placed a probe 10 for measurement of the electron temperature of the plasma as disclosed in Japanese Laid-open Patent Publication No. 135574/1979 and U.S. Pat. No. 4,242,188. In each experiment, an alternating current of 20 KHz was applied between the electrodes 2 and 2' to generate plasma, and the discharging power, the gas flow rate and the gas pressure were controlled so as to cause the electron temperature of the plasma to reach a desired value.

The plasma polymerization conditions in the respective experiments, namely the monomeric compounds and their flow rates, pressures, discharging currents, electron temperatures and polymerization times are shown in Table 1A.

The thickness (optical thickness), the density, the pencil hardness, the toughness, the atomic ratio of constituent elements, the ratio of the number of the hydrogen atoms bonded to carbon atoms having a double bond

to the number of the hydrogen atoms bonded to carbon atoms having only single bonds

of a polymeric film formed on the polycarbonate plate were measured as follows.

In order to determine the thickness of the polymeric film, a silicon wafer was placed adjacent to the polycarbonate plate during plasma polymerization and the optical thickness of the polymeric film formed at the same time on the silicon wafer was measured by an ellipsometer, and the measured value was estimated to be the thickness of the polymeric film on the polycarbonate film.

The density of the polymeric thin film was determined by dividing the weight thickness (the thickness when the density is supposed to be 1) of the polymeric thin film by the above optical thickness. The weight thickness was determined from the weight gain of the above silicon wafer caused by deposition of the polymeric film.

The pencil hardness of the polymeric film was measured by a pencil scratch tester according to JIS K 5401 (1969). The toughness of the polymeric film was evaluated as follows. With a load of 100 g applied on the polymeric film, a sapphire ball 1 mm in diameter was placed thereon and the film was scratched with the ball at a speed of 50 cm/min. The scratched surface was observed with an optical microscope (×1000), and the scratch resistance was evaluated according to the four ranks as shown below depending on the number of cracks formed in the region within one field of vision of about 30 μm in diameter.

| Rank | Number of cracks |
|------|------------------|
| A    | 0                |
| B    | 1-9              |
| C    | 10-99            |
| D    | 100 or more      |

The atomic ratio of constituent elements and the ratio in number of the hydrogen atoms bonded to carbon atoms having a double bond to the hydrogen atoms bonded to carbon atoms having only single bonds were determined by measuring IR spectra of the polymeric films on the silicon wafers mentioned above according to the methods as described above.

The results of the above experiments are shown in Table 1B.

TABLE 1A

| Experiment No.[1] | Monomeric compounds | Flow rate cc(STP)/min. | Pressure Torr | Discharging current mA | Electron temperature ×10$^4$ K. | Polymerization time (min) |
|---|---|---|---|---|---|---|
| 1 | CH$_4$ | 10 | 0.05 | 200 | 2.2 | 30 |
|   | CF$_4$ | 10 |      |     |     |    |
| 2 | C$_2$H$_6$ | 7 | 0.05 | 350 | 1.6 | 20 |
|   | C$_2$F$_6$ | 3 |      |     |     |    |
| 3 | CH$_4$ | 10 | 0.1 | 150 | 2.7 | 37 |
|   | F$_2$ | 10 |    |     |     |    |
| 4 | H$_2$ | 20 | 0.1 | 150 | 2.4 | 40 |
|   | CF$_4$ | 7 |    |     |     |    |
| 5 | 1,1-difluoroethane | 20 | 0.2 | 300 | 2.2 | 35 |
| 6 | C$_2$H$_6$ | 5 | 0.05 | 350 | 2.3 | 32 |
|   | H$_2$ | 5 |      |     |     |    |
|   | CF$_4$ | 15 |     |     |     |    |
| *7 | CH$_4$ | 3 | 0.02 | 250 | 3.7 | 40 |
|    | CF$_4$ | 3 |      |     |     |    |

TABLE 1A-continued

| Experiment No.[1] | Monomeric compounds | Flow rate cc(STP)/min. | Pressure Torr | Discharging current mA | Electron temperature $\times 10^4$ K. | Polymerization time (min) |
|---|---|---|---|---|---|---|
| *8 | $C_2H_6$ | 10 | 0.2 | 200 | 0.5 | 26 |
|  | $C_2F_6$ | 5 |  |  |  |  |
| *9 | $CH_4$ | 10 | 0.1 | 200 | 6.5 | 42 |
|  | $F_2$ | 6 |  |  |  |  |
| *10 | $H_2$ | 10 | 0.5 | 70 | 0.4 | 200 |
|  | $CF_4$ | 3 |  |  |  |  |
| *11 | $CH_4$ | 50 | 0.05 | 200 | 6.7 | 130 |
| *12 | $CH_4$ | 4 | 0.1 | 200 | 5.3 | 200 |
|  | $CF_4$ | 25 |  |  |  |  |
| *13[2] | — | — | — | — | — | — |

Note:
[1] Symbol (*) indicates comparative examples.
[2] An untreated polycarbonate plate was tested in Experiment No. 13.

TABLE 1B

| Experiment No. | Thickness Å | Pencil hardness | Toughness | Density g/cm³ | Atomic ratio of constituent elements | | | | Ratio of two kinds of hydrogen atoms (1) |
|---|---|---|---|---|---|---|---|---|---|
|  |  |  |  |  | C | H | F | O |  |
| 1 | 3200 | 4H | A | 2.4 | 1 | 0.07 | 0.06 | 0.12 | 0.06 |
| 2 | 3500 | 3H | A | 1.9 | 1 | 0.15 | 0.11 | 0.13 | 0.10 |
| 3 | 3000 | 2H | B | 1.7 | 1 | 0.14 | 0.06 | 0.11 | 0.07 |
| 4 | 3100 | 2H | B | 1.8 | 1 | 0.03 | 0.12 | 0.10 | 0.06 |
| 5 | 3800 | 2H | A | 1.7 | 1 | 0.12 | 0.11 | 0.09 | 0.09 |
| 6 | 3200 | 3H | A | 1.9 | 1 | 0.10 | 0.07 | 0.09 | 0.08 |
| *7 | 3000 | 3H | D | 2.0 | 1 | 0.06 | 0.06 | 0.33 | 0.08 |
| *8 | 3200 | B | C | 1.5 | 1 | 0.16 | 0.22 | 0.16 | 0.15 |
| *9 | 3100 | 2H | D | 1.7 | 1 | 0.16 | 0.06 | 0.31 | 0.06 |
| *10 | 1200 | 2B | C | 1.9 | 1 | 0.07 | 0.25 | 0.35 | (2) |
| *11 | 3100 | 2H | D | 1.8 | 1 | 0.16 | 0 | 0.40 | 0.08 |
| *12 | 1000 | B | C | 1.9 | 1 | 0.16 | 0.27 | 0.32 | (2) |
| *13 | — | <6B | B | — | — | — | — | — | — |

Note:
(1) Ratio in number of the hydrogen atoms bonded to carbon atoms having a double bond to the hydrogen atoms bonded to carbon atoms having only single bonds.
(2) The measurement was impossible.

EXAMPLE 2

In Experiments No. 14 to No. 25, polymeric thin films were formed on iron discs under the same conditions as in Experiments No. 1 to 12 in Example 1, except for using iron discs with a diameter of 60 mm and a thickness of 2 mm in place of the polycarbonate plates. Experiments No. 20 to No. 26 are comparative examples. Experiment No. 26 relates to an untreated iron disc.

Vickers hardness, dynamic frictional coefficient when rubbed with an iron bar, amount of abrasion and corrosion resistance of the polymeric thin film obtained in each experiment were measured.

The dynamic frictional coefficient was determined by urging the flat end surface of an iron rod 5 mm in diameter with a load of 200 g against the iron disc at a distance of 30 mm from its center, then rotating the iron disc at 200 rpm and measuring the force applied on the iron rod in the transverse direction. The amount of abrasion was determined by measuring the weight of the abraded powder when the iron disc was rotated as described above for one hour by means of a precision balance.

The corrosion resistance of the polymeric film was evaluated according to the standards shown below by spraying the iron disc with a 3.5% aqueous sodium chloride solution for 3 hours and thereafter observing the surface state:
A: no change
B: slightly brownish
C: locally deep brownish
D: wholly deep brownish The results of the above tests are shown in Table 2.

TABLE 2

| Experiment No.[1][2] | Vickers hardness | Dynamic frictional coefficient | Abrasion amount (mg) | Corrosion resistance |
|---|---|---|---|---|
| 14 | 2200 | 0.27 | ≦0.1 | A |
| 15 | 1200 | 0.24 | ≦0.1 | A |
| 16 | 1800 | 0.29 | ≦0.1 | B |
| 17 | 1700 | 0.28 | 0.15 | B |
| 18 | 1200 | 0.37 | 0.2 | A |
| 19 | 2300 | 0.25 | ≦0.1 | A |
| *20 | 2100 | 0.35 | 0.9 | D |
| *21 | 400 | 0.45 | 1.5 | B |
| *22 | 1300 | 0.30 | 1.1 | D |
| *23 | 200 | 0.32 | 1.0 | D |
| *24 | 1400 | 0.29 | 1.2 | D |
| *25 | 300 | 0.30 | 0.9 | D |
| *26[3] | 600 | 0.65 | 4 |  |

Note:
[1] Polymerization conditions including monomeric compounds were the same as in Experiment No. 1 to No. 12.
[2] Symbol (*) indicates comparative examples.
[3] An untreated iron disc was tested in Experiment No. 26.

EXAMPLE 3

After formation of polymeric thin films on polycarbonate plates in the same way as in Experiments No. 1 to No. 6 in Example 1, the polymeric thin films were treated with hydrogen plasma as described below.

In Experiments No. 27 to No. 32, after preparation of the polymeric thin films in the same way as in Experiments No. 1 to No. 6, the film formed were, after the replacement of the gas for plasma polymerization within the reactor with hydrogen gas without the exposure of the films to the atmosphere, subjected to treatment with hydrogen plasma under the conditions of a pressure of 0.2 Torr, a hydrogen gas flow rate of 20 cc(STP)min., a discharging frequency of 20 KHz, a discharging current of 300 mA and an electron temperature of $5.5 \times 10^{4°}$ K. for 30 minutes.

In Experiments No. 33 to No. 38, after preparation of polymeric thin films in the same way as in Experiments No. 1 to No. 6, the films formed were left to stand in the atmosphere at 23° C. and a relative humidity of 60% for 24 hours, followed by treatment with hydrogen plasma under the same conditions employed for Experiments No. 27 to No. 32.

After hydrogen plasma treatment, the pencil hardness, the toughness, the density, the atomic ratio of constituent elements and the atomic ratio of hydrogen atoms bonded to carbon atoms having a double bond and hydrogen atoms bonded to carbon atoms having only single bonds were measured similarly as described in Example 1. The Vickers hardness of the polymeric thin film and the transmittance of visible light were also measured. Transmittance of visible light was determined for light with wavelength ranging from 350 to 600 nm through a polymeric thin film as calculated for a thickness of 1 μm.

These results are shown in Table 3.

temperature as mentioned in Example 1. Further, the reactor is also equipped with a tube 33 for sampling of the gas in the reaction zone during plasma polymerization. The tube 33 is connected to a mass spectrum analyzer (not shown).

Figure 2:
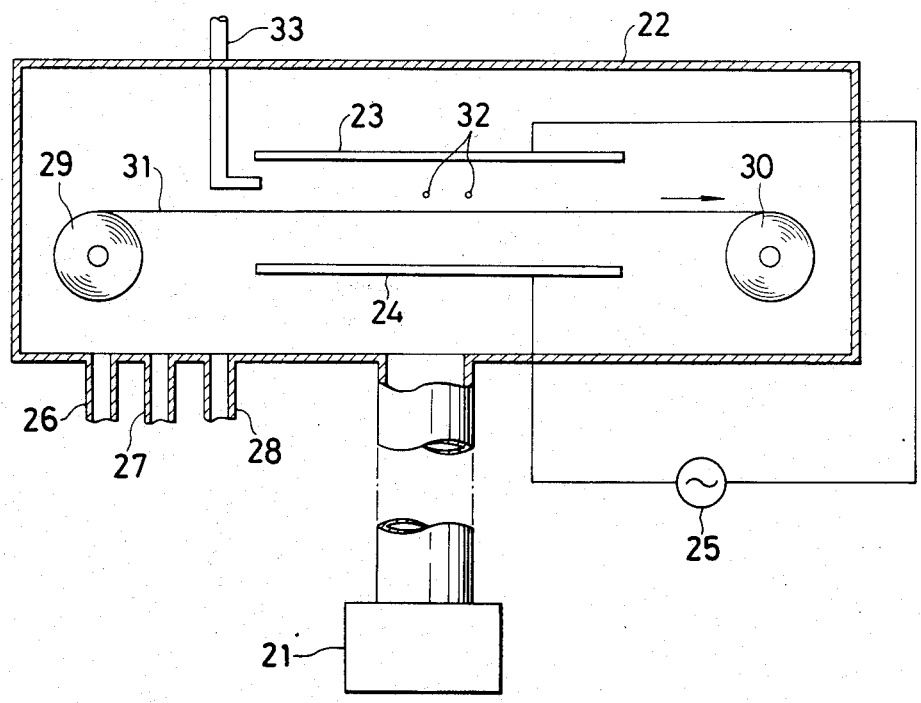
FIG. 2 shows schematically a sectional view of a device for forming a polymeric thin film on the surface of a continuous web such as base material tape for a magnetic recording medium according to the process of the present invention.

In carrying out the operation using the device shown in FIG. 2, one or more kinds of monomeric compounds are fed into the reactor 22 as the reactor 22 is evacuated by the vacuum pump 21. The pressure and the flow rates of monomeric compounds are controlled to desired values. When plasma is excited by electrical discharge between the electrodes 23 and 24, a polymeric thin film is formed through plasma polymerization on the surface of the base material tape running between the electrodes. The electron temperature in the reaction zone is measured by the probe 32 and controlled to a desired value by varying the discharging current, the pressure in the reactor, the flow rates of monomeric compounds, etc.

In Experiments No. 39 to No. 54 (Experiments No. 49 to No. 54 are comparative examples), by use of a continuous polyethyleneterephthalate film with a thickness of 12 μm and a width of 10 cm coated on its surface by oblique evaporation with a Co-Ni magnetic thin film with a thickness of 100 nm as the base material tape, polymeric thin films were formed on the magnetic metal thin film by means of the device shown in FIG. 2 to obtain magnetic recording media.

TABLE 3

| Experiment No. | Pencil hardness | Toughness | Vickers hardness | Transmittance of visible light %[1] | Density g/cm³ | Atomic ratio of constituent elements | | | | Ratio of two kinds of hydrogen atoms[2] |
|---|---|---|---|---|---|---|---|---|---|---|
| | | | | | | C | H | F | O | |
| 27 | 5H | A | 3000 | >99 | 2.5 | 1.0 | 0.09 | 0.02 | 0.04 | 0.04 |
| 28 | 4H | A | 2100 | >99 | 2.0 | 1.0 | 0.15 | 0.03 | 0.06 | 0.07 |
| 29 | 4H | A | 2200 | >99 | 1.7 | 1.0 | 0.16 | 0.02 | 0.06 | 0.06 |
| 30 | 4H | A | 2100 | >99 | 1.8 | 1.0 | 0.05 | 0.02 | 0.05 | 0.05 |
| 31 | 4H | A | 2200 | >99 | 1.8 | 1.0 | 0.15 | 0.04 | 0.04 | 0.07 |
| 32 | 4H | A | 2400 | >99 | 2.0 | 1.0 | 0.13 | 0.02 | 0.05 | 0.06 |
| 33 | 4H | A | 2500 | 97 | 2.0 | 1.0 | 0.07 | 0.04 | 0.05 | 0.05 |
| 34 | 3H | A | 2100 | 97 | 1.5 | 1.0 | 0.16 | 0.04 | 0.07 | 0.09 |
| 35 | 3H | A | 2100 | 96 | 1.8 | 1.0 | 0.16 | 0.04 | 0.09 | 0.06 |
| 36 | 3H | A | 2000 | 97 | 1.9 | 1.0 | 0.06 | 0.03 | 0.07 | 0.05 |
| 37 | 3H | A | 2200 | >99 | 1.8 | 1.0 | 0.15 | 0.04 | 0.07 | 0.08 |
| 38 | 4H | A | 2300 | >99 | 1.9 | 1.0 | 0.14 | 0.03 | 0.06 | 0.06 |

Note:
[1]Wave length: 350 to 600 nm; the values indicated were calculated for a thickness of 1 μm.
[2]Ratio in number of the hydrogen atoms bonded to carbon atoms having a double bond to the hydrogen atoms bonded to carbon atoms having single bonds only.

EXAMPLE 4

By means of the device as shown in FIG. 2, polymeric thin films were formed as protective films for magnetic recording media.

In FIG. 2, in a reactor 22 connected to a vacuum pump 21, there is provided a pair of parallel plane electrodes 23, 24 opposed to each other, and these are connected to an AC power supply 25 (20 KHz). At one corner of the reactor 22, there are provided pipes 26, 27 and 28 for feeding gaseous monomeric compounds into the reactor 22. These monomer feeding pipes are provided with flow rate controlling valves (not shown). At the side wall of the reactor 22, there is provided a pressure indicator (not shown) for monitoring the pressure within the vessel. A base material tape 31 for a magnetic recording medium to be treated is fed from a first roll 29 during operation so as to run continuously between the two electrodes 23 and 24 and be wound up on a second roll 30. In the region between the electrodes 23 and 24, at a distance of 2 cm from the tape to be treated, there is provided a probe 32 for measurement of the electron The plasma polymerization conditions, namely the monomeric compounds and their flow rates, pressure, discharging current and electron temperature for each experiment are shown in Table 4A.

For each of the thin polymeric films thus formed, the density, the atomic ratio of constituent elements, the ratio in number of the hydrogen atoms bonded to carbon atoms having a double bond

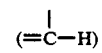

to the hydrogen atoms bonded to carbon atoms having only single bonds

were measured similarly as in Example 1. The thickness of the polymeric film was measured by an ellipsometer after the film had been deposited for a certain period of time, from which the deposition rate was determined, and the running speed of the base material tape was determined on the basis of this deposition rate for effecting control as shown in Table 4B.

Further, the scratch resistance, still life and weather resistance of the magnetic recording media thus obtained were evaluated as follows.

For evaluation of scratch resistance, each magnetic recording medium was cut into a tape 12.65 mm (½ inch) in width. A 50 m length of this tape was loaded in a VHS type VTR (trade name: NV 8200, produced by Matsushita Electric Industrial Co., Ltd.), and running was repeated for 500 times. By observation of the scratches formed after the running, the scratch resistance was evaluated according to the following standards:

1: 10 or more deep scratches per 12.65 mm
2: 5 to 9 deep scratches per 12.65 mm
3: 1 to 4 deep scratches per 12.65 mm
4: 5 or more shallow scratches per 12.65 mm
5: 4 or less shallow scratches per 12.65 mm.

Here, a deep scratch refers to a scratch which can easily be observed with a 5× loupe, while a shallow scratch refers to one which can be observed only by use of an optical microscope at 100 magnifications.

The weather resistance was evaluated according to the following standards by observation of the discolored state after a strip of the magnetic recording medium was left in an atmosphere of a temperature of 60° C. and a relative humidity of 90% for 7 days.

1: discolored over all the surface
2: discolored at 80 to 99% of the surface
3: discolored at 40 to 79% of the surface
4: discolored at 1 to 39% of the surface
5: not discolored at all.

The results of the above measurements and evaluations are listed in Table 4B.

TABLE 4A

| Experiment No.[1] | Monomeric compounds | Flow rate cc(STP)/min. | Pressure mTorr | Discharging current mA | Electron temp. ×10⁴ K. |
|---|---|---|---|---|---|
| 39 | $CH_4$ / $CF_4$ | 10 / 10 | 50 | 200 | 2.2 |
| 40 | $C_4H_{10}$ / $C_3H_8$ | 10 / 12 | 50 | 200 | 1.0 |
| 41 | $CH_4$ / $F_2$ | 10 / 10 | 100 | 150 | 2.7 |
| 42 | $CF_4$ / $H_2$ | 7 / 20 | 100 | 150 | 2.4 |
| 43 | $CH_4$ / $Cl_2$ | 10 / 10 | 50 | 150 | 2.0 |
| 44 | 1,1-difluoro-ethane | 20 | 200 | 360 | 2.9 |
| 45 | $C_3H_8$ / $C_3F_8$ | 10 / 10 | 50 | 250 | 1.3 |
| 46 | $C_2F_6$ / $H_2$ | 7 / 10 | 50 | 180 | 0.7 |
| 47 | $C_2H_6$ / $F_2$ | 10 / 10 | 100 | 310 | 2.5 |
| 48 | $C_2H_6$ / $H_2$ / $CH_4$ | 5 / 5 / 15 | 50 | 350 | 2.3 |
| *49 | $CH_4$ / $F_2$ | 10 / 6 | 100 | 200 | 6.5 |
| *50 | $CF_4$ | 15 | 50 | 330 | 2.9 |
| *51 | $CH_4$ / $CF_4$ | 3 / 3 | 20 | 250 | 3.7 |
| *52 | $C_2H_6$ / $C_2F_6$ | 10 / 5 | 200 | 200 | 0.5 |
| *53 | $CH_4$ | 50 | 50 | 200 | 6.7 |
| *54[2] | — | — | — | — | — |

Note:
[1]Symbol (*) indicates comparative examples.
[2]An untreated base material film was tested in Experiment No. 54.

TABLE 4B

| Experiment No. | Thickness Å | Density g/cm³ | Atomic ratio of constituent elements | | | | Ratio of two kinds of hydrogen atoms | Scratch resistance | Still life time min. | Weather resistance |
|---|---|---|---|---|---|---|---|---|---|---|
| | | | C | H | X | O | | | | |
| 39 | 120 | 2.4 | 1.0 | 0.07 | 0.06 | 0.12 | 0.06 | 5 | ~40 | 5 |
| 40 | 100 | 1.7 | 1.0 | 0.10 | 0.08 | 0.11 | 0.08 | 5 | ~40 | 5 |
| 41 | 100 | 1.7 | 1.0 | 0.14 | 0.06 | 0.11 | 0.07 | 5 | ~30 | 5 |
| 42 | 100 | 1.8 | 1.0 | 0.03 | 0.12 | 0.10 | 0.06 | 5 | ~30 | 5 |
| 43 | 110 | 1.8 | 1.0 | 0.10 | 0.07 | 0.11 | 0.08 | 5 | ~30 | 5 |
| 44 | 150 | 1.7 | 1.0 | 0.12 | 0.11 | 0.09 | 0.09 | 4 | ~30 | 4 |
| 45 | 100 | 1.7 | 1.0 | 0.07 | 0.12 | 0.10 | 0.08 | 5 | ~40 | 5 |
| 46 | 100 | 1.8 | 1.0 | 0.09 | 0.12 | 0.11 | 0.08 | 4 | ~40 | 4 |
| 47 | 110 | 1.8 | 1.0 | 0.08 | 0.12 | 0.09 | 0.07 | 5 | ~30 | 5 |
| 48 | 120 | 1.9 | 1.0 | 0.10 | 0.07 | 0.09 | 0.08 | 5 | ~30 | 5 |
| *49 | 100 | 1.9 | 1.0 | 0.16 | 0.06 | 0.31 | 0.06 | 2 | ~10 | 4 |
| *50[3] | — | — | — | — | — | — | — | 3 | ~5 | 2 |
| *51 | 100 | 1.9 | 1.0 | 0.06 | 0.06 | 0.33 | 0.08 | 3 | ~10 | 2 |
| *52 | 100 | 1.6 | 1.0 | 0.16 | 0.22 | 0.16 | 0.15 | 4 | ~10 | 3 |
| *53 | 100 | 1.8 | 1.0 | 0.16 | 0.03 | 0.40 | 0.08 | 3 | ~5 | 3 |
| *54 | — | — | — | — | — | — | — | 3 | ~5 | 2 |

Note:
[3]No polymeric film was formed in Experiment No. 50.

EXAMPLE 5

After formation of polymeric thin films on base material tapes in the same way as in Experiments No. 39 to No. 48 in Example 4, said polymeric thin films were subjected to treatment with hydrogen plasma as described below.

In Experiments No. 55 to No. 64, after preparation of polymeric thin films in the same way as in Experiments No. 39 to 48, said thin films were, after the replacement of the gas for plasma polymerization within the reactor with hydrogen gas without exposure of the films to the atmosphere, subjected to treatment with hydrogen plasma under the conditions of a pressure of 0.2 Torr, a hydrogen gas flow rate of 20 cc(STP)/min., a discharge frequency of 20 KHz, a discharge current of 300 mA and an electron temperature of $5.5 \times 10^{4°}$ K. for one minute.

In Experiments No. 65 to No. 74, after preparation of polymeric thin films in the same way as in Experiments No. 39 to No. 48, the films formed were left to stand in the atmosphere at 23° C. and a relative humidity of 60% for 24 hours, followed by treatment with hydrogen plasma under the same conditions employed for Experiments No. 55 to 64.

After the hydrogen plasma treatment, the atomic ratio of constituent atoms and the atomic ratio of the hydrogen atoms bonded to carbon atoms having a double bond to the hydrogen atoms bonded to carbon atoms having only single bonds were measured similarly as in Example 4. Further, the scratch resistance, the still life time and the weather resistance of the magnetic recording media after the hydrogen plasma treatment were evaluated similarly as in Example 4.

Figure 3:
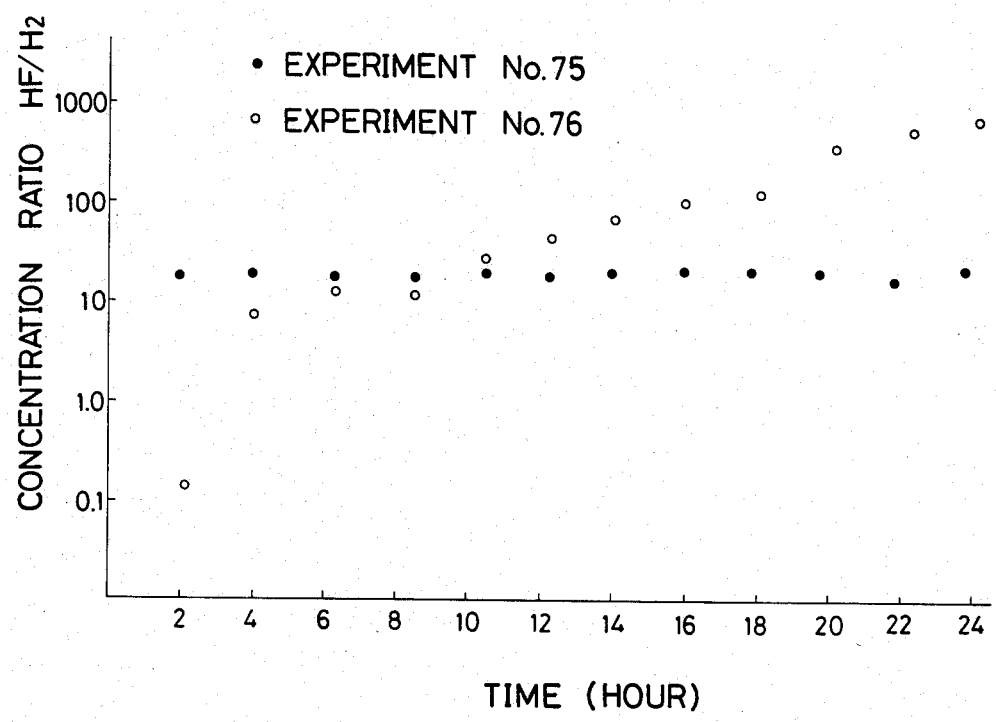
FIG. 3 is a graph of the change in the concentration ratio of hydrogen fluoride (HF) to hydrogen (H$_2$) monitored in the experiments in Example 6.

The results of the above measurements and evaluations are shown in Table 5.

zone was subjected to mass analysis by means of a quadrupole mass analyzer for determination of the concentration ratio of hydrogen fluoride (HF) to hydrogen ($H_2$) in the gas. While the flow rate ratio of methane to tetrafluoromethane fed into the reactor was maintained at 1:1, the concentration ratio of the aforesaid concentration of HF to $H_2$ was controlled to within the range of from 15 to 25 by continuously varying the total flow rate within the range of from 5 to 30 cc(STP)/min. Thus, preparation of a magnetic recording medium was continued for 24 hours. The results of the HF/$H_2$ concentration ratio in the reaction zone during this operation are shown in FIG. 3.

The magnetic recording medium as prepared above was cut at intervals of 120 m to obtain Samples No. 1 to 12 in the order as prepared from the end at which preparation was initiated. Ten portions were cut from different regions of each sample and evaluated for scratch resistance, still life time and weather resistance as described in Example 4. The evaluation of each sample was based on the average for the ten portions. The evaluation results for Samples No. 1 to 12 are listed in Table 6. In Experiment No. 76, the magnetic recording

TABLE 5

| Experiment No. | Atomic ratio of constituent elements | | | | Ratio of two kinds of hydrogen atoms[1] | Scratch resistance | Still life time min. | Weather resistance |
| --- | --- | --- | --- | --- | --- | --- | --- | --- |
| | C | H | X | O | | | | |
| 55 | 1.0 | 0.09 | 0.02 | 0.04 | 0.04 | 5 | ~60 | 5 |
| 56 | 1.0 | 0.11 | 0.05 | 0.10 | 0.06 | 5 | ~50 | 5 |
| 57 | 1.0 | 0.16 | 0.02 | 0.06 | 0.06 | 5 | ~60 | 5 |
| 58 | 1.0 | 0.02 | 0.05 | 0.02 | 0.05 | 5 | ~50 | 5 |
| 59 | 1.0 | 0.11 | 0.05 | 0.09 | 0.07 | 5 | ~50 | 5 |
| 60 | 1.0 | 0.15 | 0.04 | 0.04 | 0.07 | 5 | ~50 | 5 |
| 61 | 1.0 | 0.08 | 0.05 | 0.06 | 0.07 | 5 | ~60 | 5 |
| 62 | 1.0 | 0.10 | 0.05 | 0.06 | 0.06 | 5 | ~60 | 5 |
| 63 | 1.0 | 0.09 | 0.04 | 0.08 | 0.05 | 5 | ~50 | 5 |
| 64 | 1.0 | 0.13 | 0.02 | 0.05 | 0.06 | 5 | ~50 | 5 |
| 65 | 1.0 | 0.07 | 0.04 | 0.05 | 0.05 | 5 | ~50 | 5 |
| 66 | 1.0 | 0.10 | 0.05 | 0.10 | 0.07 | 5 | ~40 | 5 |
| 67 | 1.0 | 0.16 | 0.04 | 0.09 | 0.06 | 5 | ~40 | 5 |
| 68 | 1.0 | 0.06 | 0.03 | 0.07 | 0.05 | 5 | ~30 | 5 |
| 69 | 1.0 | 0.10 | 0.05 | 0.09 | 0.07 | 5 | ~40 | 5 |
| 70 | 1.0 | 0.15 | 0.04 | 0.07 | 0.08 | 5 | ~45 | 5 |
| 71 | 1.0 | 0.08 | 0.05 | 0.08 | 0.07 | 5 | ~50 | 5 |
| 72 | 1.0 | 0.10 | 0.05 | 0.08 | 0.06 | 5 | ~40 | 5 |
| 73 | 1.0 | 0.09 | 0.05 | 0.09 | 0.05 | 5 | ~35 | 5 |
| 74 | 1.0 | 0.14 | 0.03 | 0.06 | 0.06 | 5 | ~40 | 5 |

Note:
[1]Ratio in number of the hydrogen atoms bonded to carbon atoms having a double bond to the hydrogen atoms bonded to carbon atoms having single bonds only.

EXAMPLE 6

In Example No. 75, by means of the device shown in FIG. 2, a polymeric thin film was formed according to the procedure as described below on the same continuous polyethylene terephthalate film having the magnetic metal thin film as that used in Example 4. As the monomeric compounds, methane and tetrafluoromethane were employed. During plasma polymerization, while the pressure in the reactor was maintained at 0.05 Torr, the discharging current was continuously controlled so that the electron temperature of the plasma in the reaction zone became $2.2 \times 10^{4°}$ K., and the base material film was permitted to run at a speed of 1 m/min. During the reaction, the gas sampled through the sampling tube 33 shown in FIG. 2 from the reaction medium was prepared in the same manner as in Experiment No. 75 except that the total flow rate of methane and tetrafluoromethane was maintained at 20 cc(STP)/min. and the concentration ratio of HF/$H_2$ was not particularly controlled. The results of monitoring the HF/$H_2$ concentration ratio in the same manner as in Experiment No. 75 are also shown in FIG. 3. The magnetic recording medium obtained was cut as described above to obtain Samples No. 1' to No. 12' in the order as prepared. These samples were evaluated similarly as in Experiment No. 75 to obtain the results, which are also shown in Table 6.

From Table 6, it can be seen that the product of Experiment No. 75 is superior in uniformity and reproducibility of performance to the product of No. 76.

TABLE 6

| | Experiment No. 75 | | | Experiment No. 76 | | | |
|---|---|---|---|---|---|---|---|
| Sample No. | Scratch resistance | Still life time min. | Weather resistance | Sample No. | Scratch resistance | Still life time min. | Weather resistance |
| 1 | 4.9 | >30 | 4.9 | 1' | 4.5 | 30 | 4.8 |
| 2 | 5.0 | >30 | 5.0 | 2' | 4.7 | >30 | 4.9 |
| 3 | 5.0 | >30 | 5.0 | 3' | 5.0 | >30 | 5.0 |
| 4 | 5.0 | >30 | 5.0 | 4' | 5.0 | >30 | 5.0 |
| 5 | 5.0 | >30 | 5.0 | 5' | 5.0 | >30 | 5.0 |
| 6 | 5.0 | >30 | 5.0 | 6' | 5.0 | >30 | 5.0 |
| 7 | 5.0 | >30 | 5.0 | 7' | 4.9 | 30 | 5.0 |
| 8 | 5.0 | >30 | 5.0 | 8' | 4.8 | 30 | 5.0 |
| 9 | 5.0 | >30 | 4.9 | 9' | 4.7 | 30 | 4.8 |
| 10 | 5.0 | >30 | 4.9 | 10' | 4.7 | >30 | 4.7 |
| 11 | 4.9 | >30 | 5.0 | 11' | 4.8 | >30 | 4.7 |
| 12 | 5.0 | >30 | 5.0 | 12' | 4.7 | 30 | 4.7 |

EXAMPLE 7

In Experiments No. 77 to No. 86, on each of the polymeric thin films of the respective magnetic recording media prepared in the same way as in Experiments No. 39 to No. 48, a lubricant layer of stearic acid was applied in an amount of 10 mg/m². The still life of each of the products obtained was measured similarly as in Example 4. The results are shown in Table 7.

TABLE 7

| Experiment No. | Still life time min. |
|---|---|
| 77 | ~60 |
| 78 | ~50 |
| 79 | ~50 |
| 80 | ~40 |
| 81 | ~50 |
| 82 | ~50 |
| 83 | ~60 |
| 84 | ~50 |
| 85 | ~50 |
| 86 | ~60 |

EXAMPLE 8

In Experiments No. 87 to No. 96, on each of the polymeric thin film surface of magnetic recording media prepared in the same way as in Experiments No. 55 to No. 64 of Example 5 in which the polymeric thin films were treated with hydrogen plasma without exposure to the atmosphere, a lubricant layer of stearic acid was applied in an amount of 10 mg/m². The still life of each product obtained was measured to obtain the results as shown in Table 8.

TABLE 8

| Experiment No. | Still life time min. |
|---|---|
| 87 | >60 |
| 88 | >60 |
| 89 | ~60 |
| 90 | ~60 |
| 91 | ~60 |
| 92 | ~60 |
| 93 | >60 |
| 94 | >60 |
| 95 | ~60 |
| 96 | >60 |

We claim:

1. A process for preparing a polymeric thin film having a thickness of not less than 10 Å and having a Vicker's hardness of at least 1,000 on the surface of substrate placed in reaction zone by providing a gas containing at least one monomeric compound selected from the group consisting of halogenated alkanes (A), alkanes (B), hydrogen (C) and halogens (D) in accordance with any of the combinations set forth as follows:
   (1) only A;
   (2) A and B;
   (3) A and C;
   (4) A and D;
   (5) A, B and C;
   (6) A, B and D;
   (7) A, C and D;
   (8) A, B, C and D;
   (9) B and D; or
   (10) B, C and D, for plasma polymerization, wherein the atomic ratio of halogen/hydrogen in said gas is 0.1 to 5, the flow rate of said gas flowing into the reactor in which said plasma polymerization is carried out is from 0.1 to 100 cc (STP)/min. per 100 liter of inner volume of the reactor and the electron temperature of the plasma in the reaction zone for plasma polymerization is at least 6,000° K. and lower than 30,000° K.

2. The process according to claim 1, wherein said halogenated alkanes are fluoroalkanes, chloroalkanes, fluorochloroalkanes or the mixtures thereof and said halogens are fluorine, chlorine or the mixture thereof.

3. The process according to claim 1, wherein the concentration ratio of hydrogen halide (HX), which is a by-product of the plasma polymerization, to hydrogen ($H_2$) in the reaction zone for plasma polymerization is in the range of 0.1 to 500.

4. A process for preparing a polymeric thin film having a thickness of not less than 10 Å and having a Vicker's hardness of at least 1,000 on the surface of a substrate placed in a reaction zone by providing a gas containing at least one monomeric compound selected from the group consisting of halogenated alkanes (A), alkanes (B), hydrogen (C) and halogens (D) in accordance with any of the combination set forth as follows:
   (1) only A;
   (2) A and B;
   (3) A and C;
   (4) A and D;
   (5) A, B and C;
   (6) A, B and D;
   (7) A, C and D;
   (8) A, B, C and D;
   (9) B and D; or
   (10) B, C and D, for plasma polymerization, wherein the atomic ratio of halogen/hydrogen in said gas is 0.1 to 5, the flow rate of said gas flowing into the reactor in which said plasma polymerization is carried out is from 0.1 to 100 cc (STP)/min. per 100 liter of inner volume of the reactor and the electron termperature of the plasma in the reaction zone for plasma polymerization is at least 6,000° K. and lower than 30,000° K., and the polymeric thin film thus formed is further treated with hydrogen plasma.

5. The amorphous polymeric thin film prepared on a substrate by the process of claim 1 or 2.

6. The amorphous polymeric thin film according to claim 5, wherein the substrate is a base material for a magnetic recording medium comprising a non-magnetic support and a magnetic metal thin-film provided therein, the amorphous polymeric thin film having a thickness of 20 Å to 0.1 μm being formed on said magnetic metal thin film.

7. The amorphous polymeric thin film according to claim 6 on which a lubricant layer is further formed.

8. The amorphous polymeric thin film according to claim 5, wherein the substrate is a metallic article.

9. The amorphous polymeric thin film according to claim 5, wherein the substrate is a plastic article.

10. The amorphous polymeric thin film according to claim 5, wherein the substrate is finely powdered metal.

11. The amorphous polymeric thin film according to claim 5, wherein the substrate is finely powdered diamond.

12. An amorphous polymeric thin film having a thickness of not less than 10 Å and having a Vicker's hardness of at least 1,000 formed on a substrate, consisting essentially of carbon (C), hydrogen (H), halogen (X) and oxygen (O) at an atomic ratio of these elements represented by the formula:

$$C_{1.0}H_{0.005-0.2}X_{0.005-0.2}O_{0.005-0.3}$$

and having a ratio of the number of hydrogen atoms bonded to carbon atoms having a double bond

to the number of hydrogen atoms bonded to carbon atoms having only single bonds

of 0 to 0.1 and a density of 1.6 to 3.5 g/cm³.

13. The amorphous polymeric thin film according to claim 12, wherein the atomic ratio of halogen (X) to carbon (C) is 0.005 to 0.05 and that of oxygen (O) to carbon (C) is 0.005 to 0.15.

14. The amorphous polymeric thin film according to claim 12, wherein the substrate is a base material for a magnetic recording medium comprising a non-magnetic support and a magnetic metal thin film provided thereon, the amorphous polymeric thin film having a thickness of 20 Å to 0.1 μm being formed on said magnetic metal thin film.

15. The amorphous polymeric thin film according to claim 14 on which a lubricant layer is further formed.

16. The amorphous polymeric thin film according to claim 12, wherein the substrate is a metallic article.

17. The amorphous polymeric thin film according to claim 12, wherein the substrate is a plastic article.

18. The amorphous polymeric thin film according to claim 12, wherein the substrate is finely powdered metal.

19. The amorphous polymeric thin film according to claim 12, wherein the substrate is finely powdered diamond.

* * * * *